Figure 2:
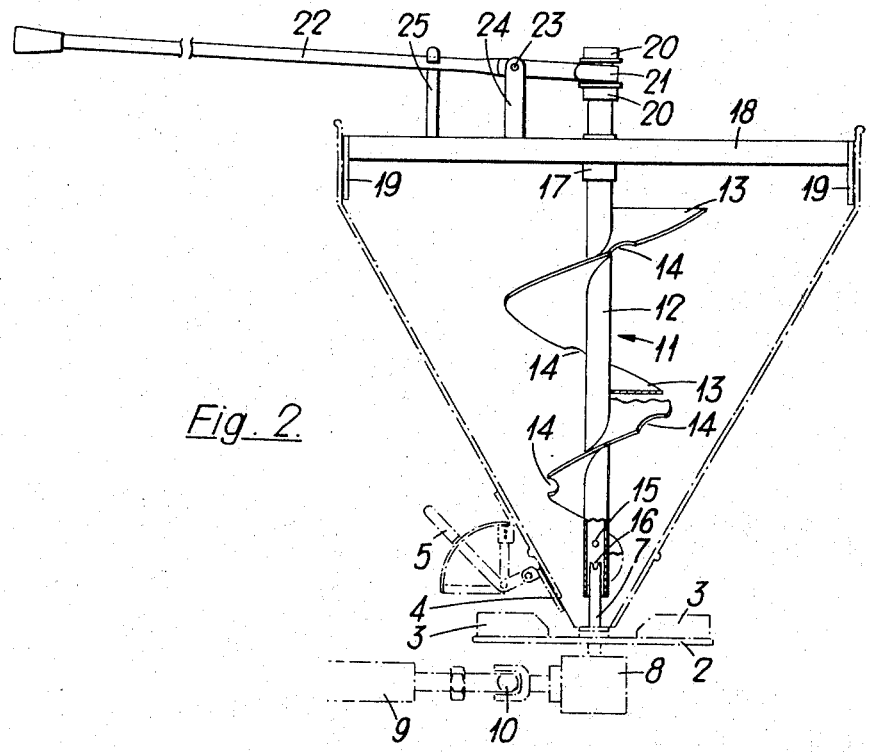

United States Patent [19]
Trafford

[11] 3,782,642
[45] Jan. 1, 1974

[54] BROADCASTING DEVICES

[76] Inventor: Alan Hall Trafford, 44 Wood St., Chatteris, England

[22] Filed: Dec. 20, 1971

[21] Appl. No.: 210,053

[30] Foreign Application Priority Data
Dec. 21, 1970 Great Britain............... 60,607/70
Oct. 11, 1971 Great Britain............... 47,271/71

[52] U.S. Cl................. 239/683, 222/240, 239/670
[51] Int. Cl............................................. A01c 17/00
[58] Field of Search................... 239/668, 670, 683, 239/684, 685, 686, 687; 222/240, 241, 413

[56] References Cited
UNITED STATES PATENTS
| | | | |
|---|---|---|---|
| 2,758,842 | 8/1956 | Burroff | 239/687 |
| 3,508,687 | 4/1970 | Burgstaller | 222/241 X |
| 3,038,643 | 6/1962 | Van der Lely et al. | 239/687 X |
| 2,389,845 | 11/1945 | Erickson | 222/240 X |

FOREIGN PATENTS OR APPLICATIONS
150,478 3/1953 Australia............................ 239/683
1,224,552 9/1966 Germany........................... 239/684

Primary Examiner—M. Henson Wood, Jr.
Assistant Examiner—Andres Kashnikow
Attorney—Paul Bogden and Eward F. Welsh

[57] ABSTRACT

Broadcasting devices as used in agriculture and horticulture having a container and a rotary or oscillating distributor are fitted with a charge blender in the form of an upright modified Archimedean Screw driven by the distributor to lift, mix and blend charge material in the container so as to enable a charge of different particulate or powdered materials placed individually in the container to be blended into a homogeneous mix immediately prior to broadcasting.

The charge blender conveniently consists of a single-flight Archimedean Screw of upwardly increasing diameter and shaped, e.g. inclined or notched, so as to act as a low-efficiency auger when rotated in a mass of particulate material.

13 Claims, 4 Drawing Figures

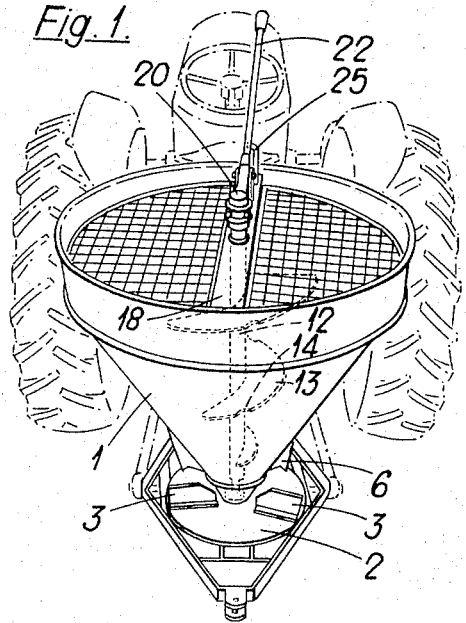
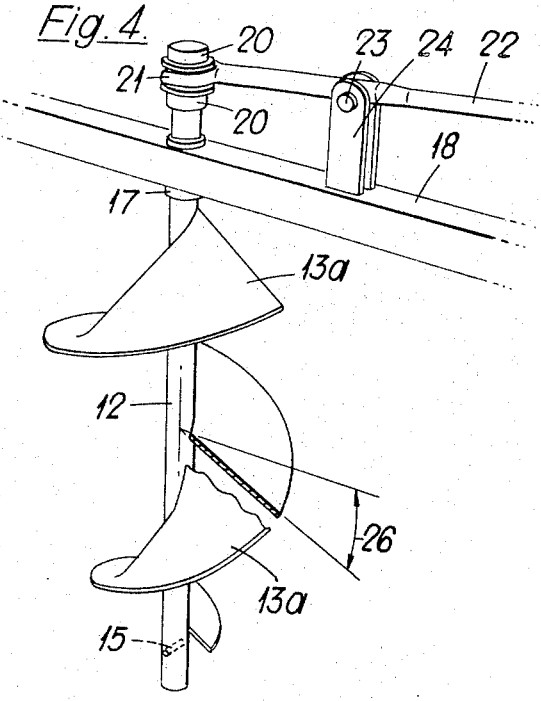

BROADCASTING DEVICES

BACKGROUND TO INVENTION

The invention concerns broadcasting devices such as are used in agriculture and horticulture for the broadcast distribution of solid particulate or powder materials, e.g. artificial fertilizer granules. Such devices comprise, generally, a container such as a hopper for the material to be broadcast having an opening (usually gated) through which material therein may flow by gravity to a distributor which may be a horizontal disc that is adapted to be rotated about a vertical axis and having blades or vanes to engage the material and to accelerate this so that it is thrown from the disc, or which may be a nozzle that is adapted to be oscillated in a generally horizontal arc so that material entering the nozzle is accelerated and thereby discharged from the nozzle. For convenience, broadcasting devices of both these constructions will hereinafter be referred to as being "of the kind described."

In devices of the kind described and in which the distributor is a rotating disc, the disposition of the container outlet with respect to the axis of the disc, in relation to the direction in which the device is intended to be moved whilst broadcasting, determines at least to a certain extent the distribution of the material falling upon the disc, relatively to the path of motion of the device; to ensure distribution in the required pattern the device may have a shield arranged to surround part of the periphery of the disc and so prevent the discharge of material within a given arc determined by the limits of such shield. Devices having a distributor in the form of an oscillating nozzle, on the other hand, obtain the required distribution pattern by suitable relationships between, inter alia, the nozzle length, the angular amplitude of the oscillation, and the inclination of the nozzle to the horizontal.

Broadcasting devices of the kind described may be arranged for mounting directly on a tractor or similar farm vehicle, e.g. on the lifting linkage of a tractor, rotation of the distributor disc or oscillation of the distributor nozzle being accomplished by a suitable drive from a power take-off on the tractor or other vehicle; alternatively, such a device may be fitted with wheels to be towed in the manner of a trailer in which case the distributor disc or nozzle may either be arranged to be driven from a power take-off or it may be coupled to the wheels of the device to be driven by rotation of the wheels.

The solid compound fertilizers that are often distributed by the use of such broadcasting devices are often of granular form, consisting of individual granules formed by co-granulation of a mixture of various ingredients that together supply the required plant foods in the desired relative proportions. These granular fertilizers are relatively costly due to the substantial capital cost of the plant required for their production and also because, to meet the particular requirements of different crops growing in different areas and under different conditions, the manufacturers have to provide a range of compound fertilizers of different analysis that must be separately manufactured, transported and stored.

In spite of these cost disadvantages, such compound fertilizers are put up in granular form, with granules of uniform individual composition, for a number of reasons, not the least of which is a requirement, statutory in some countries, that random samples taken at any time from a batch of compound fertilizer of a specified analysis shall conform to that analysis within fairly close tolerances. Simple mixing of ingredients consisting individually of granules, crystals, powders and so on of different physical form and density will produce a batch having a specified composition overall, with reasonable uniformity throughout the batch at the completion of the mixing operation, but segregation of the different ingredients readily occurs during handling and storage so that random samples subsequently taken will show a wide and unacceptable variation in their analysis. Moreover, certain ingredients of a compound fertilizer have imcompatible physical properties for the maintenance of a free-flowing particulate mixture of such ingredients.

For these reasons, centralised bulk-blending of fertilizer ingredients, except to serve a relatively small locality, is not practised to any significant extent.

On-site blending by the individual user would have, in addition to a cost advantage over purchase of granular fertilizer, the added advantage of enabling the user to put up a compound fertilizer of analysis specifically adapted to the requirements of a particular application. On-site blending would also often show the latter advantage over centralised bulk-blending for the locality where the available blend did not exactly match the requirements of an individual user. However, hitherto on-site blending has not been thought to be a practical proposition for the typical user, owing to the assumed need for relatively complex and high capital cost equipment to accomplish satisfactory blending. Farm financing arrangements generally favour the purchase of relatively high cost ready-to-apply granular fertilizers as and when required, or locally bulk-blended compounds, rather than the capital investment in a high-cost blending plant coupled with relatively low cost bulk purchase of individual fertilizer ingredients.

However, the foregoing considerations concerning on-site blending by the individual user are based upon the hitherto widely accepted belief that on-site blending would require the use of complex and costly blending plant involving an initial substantial capital investment and further cost in connection with its operation and maintenance. I have discovered that this is in fact a false assumption in that, surprisingly, experiment has shown that a relatively simple attachment to an otherwise conventional broadcasting device of the kind described will enable such device itself to accomplish on-site blending of a charge of individual fertilizer ingredients, immediately prior to broadcasting of such charge by the operation of the device in the conventional manner.

Thus experience has shown that at low cost and with no compromising of its normal performance as a broadcasting device, a conventional broadcasting device of the kind described may be so adapted, in accordance with the invention, as to enable it, within a period of, usually, less than one minute, to effect extremely efficient blending of a charge made up of separately added ingredients and immediately thereafter to broadcast the blended charge by the normal operation of the device. Moreover, and surprisingly, it has been found that notwithstanding wide variations in physical form and density of the several ingredients that may constitute a charge, the individual ingredients of the blended charge will be distributed substantially uniformly throughout the area over which the blended charge is broadcast: that is, the broadcasting device does not significantly 'deblend' the charge in broadcasting it.

BRIEF DESCRIPTION OF INVENTION

The present invention accordingly provides, in or for a broadcasting device of the kind described, a charge blender comprising a modified Archimedean screw arranged or adapted to be arranged with its axis vertical within the charge container of the broadcasting device and having drive means coupling or adapted to couple the lower end of said screw to the distributor of said device for rotation in response to the motion of the distributor, said screw being adapted to function as an auger to lift and laterally displace charge material in its vicinity.

For optimum results, the form of the modified Archimedean screw of the charge blender is adapted to the shape and dimensions of the container of the broadcasting device in which it is to be incorporated. Typically, however, broadcasting devices of the kind described have charge containers in the form of a conical hopper with a central axial outlet and I have found that an Archimedean screw having a single flight of progressively increasing radial extent is particularly suitable. Desirably the notional cone defined by the periphery of the flight of such a screw has a cone angle not greater than about one-half the cone angle of the hopper within which the blender is to be fitted. Desirably, moreover, the flight is so arranged as progressively to "spill" charge material lifted by it due to its rotation so that there is a substantial mixing of individual particles being lifted by rotation of the screw in a mass of particles in the charge container.

Thus, in one embodiment of the invention, the flight of the screw is inclined with respect of the screw axis in the sense that, considering the screw in its operative vertical position, the intersection of the flight with any plane containing the axis of the screw has a trace that slopes downwardly outwards. With this flight configuration, the action of the flight upon the charge material is to impel this upwardly and outwardly and so induce positive circulation of the material within the container.

In another and presently preferred embodiment, however, the flight of the screw has window areas, conveniently crescent-shaped notches in its edge, through which charge material may fall to become associated with underlying portions during lifting by rotation of the screw. It is found that the starting torque of a screw of this form is significantly lower than that of a screw without such notches or window areas and, accordingly, less stress is applied during starting of rotation of such a screw. This is of advantage in the usual case where, as hereinafter explained, the screw is driven by simple coupling to the distributor.

Conveniently, that end of the screw which is uppermost in operation may be supported in a suitable bearing in a transverse bearer adapted to span the upper end of the charge container of the broadcasting device to which the blender is, or is to be, fitted. Whilst the screw may be supported at this point by an antifriction bearing, possibly sealed and lubricated, in preferred embodiments of the invention the screw is supported in a plain metal bearing in such a transverse bearer because, as will be explained, in such embodiments the blender is adapted only to be operated for short periods and a plain metal bearing, unlubricated, is adequate for the duty involved and involves no maintenance or sealing problems.

The said drive means may take any convenient form and will in any event depend upon the form of the distributor of the broadcasting device to which the blender is to be fitted. However most broadcasting devices have a distributor with a central hub or shaft formed at its upper end with at least one transverse slot that is suitable to accept a transverse drive pin or key of a coupling for the screw. Because, in operation, there is a downward reaction thrust on the screw there will in general be no requirement for any elaborate arrangements for maintaining engagement between the lower end of the screw or its coupling and the distributor.

In appropriate cases, the distributor may be specially fitted with a tubular boss having a transverse slot or equivalent key-receptacle for engagement with a driving pin or key of a coupling for the screw. Where the distributor is a rotating disc, a direct connection between the lower end of the screw and the hub of the disc may form the coupling:where the distributor is an oscillating nozzle, the coupling will comprise a ratchet or like for producing a one-way drive for the screw in response to oscillation of the nozzle.

In preferred embodiments of the invention, means are provided for disengaging the drive means of the charge blender when the distributor of the broadcasting device is operated during broadcasting. Conveniently, the transverse bearer that supports the upper end of the screw may be fitted with a pivot for a lever having a forked end that engages a collar on the upper end of the screw so that movement of the lever may be effective to raise and lower the screw with respect to the transverse bearer, the arrangement being such that only in its lowered position will the lower end of the screw be in driving relationship with the distributor of the broadcasting device.

THE DRAWINGS AND DESCRIPTION OF EMBODIMENTS OF THE INVENTION

In order that the invention may be fully understood two embodiments thereof will now be described by way of example and with reference to the accompanying drawings, in which:

FIG. 1 is a perspective view of one embodiment of a broadcasting device fitted with a charge blender in accordance with the invention, the device being shown fitted to an agricultural tractor;

FIG. 2 is a side elevation of the charge blender of the device of FIG. 1, parts of the broadcasting device also being shown for the purpose of illustration;

FIG. 3 is a plan view of the charge blender of FIG. 2; and

FIG. 4 is a fragmentary perspective view of a charge blender constituting another embodiment of the invention.

FIG. 1 of the drawings illustrates a typical broadcasting device of the kind described hereinbefore, fitted to the rear of an agricultural tractor and supported by the usual lifting linkage thereof and adapted to be driven by the rear power take-off of the tractor.

The illustrated broadcasting device comprises, as is usual, a charge container in the form of a conical hopper 1 arranged vertically over a distributor which in this case is in the form of a horizontal disc 2 adapted to be rotated about a vertical axis and having blades 3 on the outer part of its upper surface to cause material falling on to this part of the disc surface to be accelerated so as to be thrown more or less radially from the periphery of the disc. The central portion of the disc 2 substantially closes the bottom of the hopper 1 and a portion of the side wall of the hpper at its lower edge is movable towards and away from the disc 2 so as thereby to define an outlet through which charge material in the hopper 1 may flow outwardly on to the bladed portion of the disc 2. This movable wall portion, shown diagrammatically at 4 in FIG. 2, thus constitutes an outlet gate for the hopper 1. This outlet gate 4 is normally positioned in the front part of the hopper wall as indicated in FIG. 2 and is moved between its closed and open positions by means of a suitable linkage with an operating handle 5. An arcuate shield 6 extends around the periphery of the disc 2 at the front of the device, thereby to prevent charge material from the hopper 1 being thrown off the disc 2 in a forwards direction.

As indicated in FIG. 2, the disc 2 has a central vertical drive shaft 7 which is supported in suitable bearings (not shown) and which forms the output shaft of a gear box 8 the input of which is adapted to be coupled by suitable shafting 9 with universal couplings such as shown at 10 to the rear power take-off of the tractor to which the broadcasting device is fitted.

In accordance with the invention, the broadcasting device is fitted with a charge blender which comprises a modified Archimedean screw generally indicated at 11 and which consists of a central shaft 12 having a single helical flight 13 secured thereabout. In FIG. 2, part of this flight 13 is shown broken away to reveal its section at the intercept with a radial plane (the plane of the paper) containing the axis of the shaft 12 and as in the case of a conventional Archimedean screw, the intercept of the flight with such a plane is at right angles to the axis of shaft 12: that is to say, the trace of the flight in any radial plane containing the axis of the screw is at right angles to such axis. As compared with the conventional Archimedean screw, the screw 11 is modified in two respects. Thus the flight 13 is of progressively increasing radius in an upwards direction so that its periphery lies in the surface of a notional cone. Desirably and as shown, the apex angle of such cone is approximately one-half the corresponding cone angle of the hopper 1 within which the charge blender is disposed.

The screw 11 is modified in a second respect in that it has window are as that reduce its efficiency as an auger. These window areas are constituted by crescent-shaped cut-outs or notches 14 at intervals in its periphery, the whole arrangement being such that when the screw 11 is rotated within the hopper 1 in the sense to raise charge material therein, in the manner of an auger, a proportion of the lifted charge material will fall through the window areas provided by the cut-outs 14 before reaching the highest level in the hopper and there will thus be intensive recirculation and mixing of portions of the charge material with one another so as quickly to tend to distribute any given small portion of the charge material throughout the mass of the latter.

The shaft 12 is formed by a tube the lower end of which is sized to fit loosely over the upper end of the shaft 7. A transverse drive pin 15 near the lower end of the shaft 12 is arranged to engage with a transverse slot 16 in the upper end of the shaft 7 so as to provide a dog-clutch type of coupling between the two shafts 7 and 12.

At its upper end, the shaft 12 is supported in a bearing sleeve 17 fitted in a transverse bearer 18 that is adapted to span the upper end of the hopper 1, the ends of the bearer 18 being fitted with suitably shaped plates 19 to engage the interior of the top of the hopper 1 and so locate the bearer 18 diametrically therein.

The upper end of the shaft 12 is fitted with a pair of spaced-apart collars 20 that between them define a peripheral groove receiving the forked end 21 of a lever 22 that is pivoted at 23 in a bifurcated bracket 24 on the bearer 18. The arrangement is such that rocking of the lever 22 is effective to raise and lower the shaft 12 with respect to the bearer 18, for the purpose of engaging and disengaging the drive pin 15 in the slot 16 of the shaft 7. The bearer 18 is further provided with a hook 25 under which the lever 22 may be engaged, as shown in FIGS. 2 and 3, to retain the lever with the shaft 12 in a raised position in which the pin 15 is out of engagement with the slot 16.

As shown in FIG. 1, the charge blender will usually be fitted into the hopper 1 with the bearer beam 18 extending more/or less fore-and-aft and so that the lever 22 extends forwardly to a position convenient for operation by the tractor driver. In FIG. 1 the lever 22 is shown disengaged from the hook 25, the shaft 12 being in its lowered position with its pin 15 in driving engagement in the slot 16, being retained in this position by the weight of the screw 11 and also, when in operation, by the reaction downthrust on the screw 11 due to its rotation within charge material in the hopper 1.

FIG. 4 illustrates a charge blender constituting another embodiment of the invention. In this embodiment, parts corresponding with those of the charge blender illustrated in FIGS. 1 to 3 are marked with the same reference numerals and will not be further described.

Figure 3:
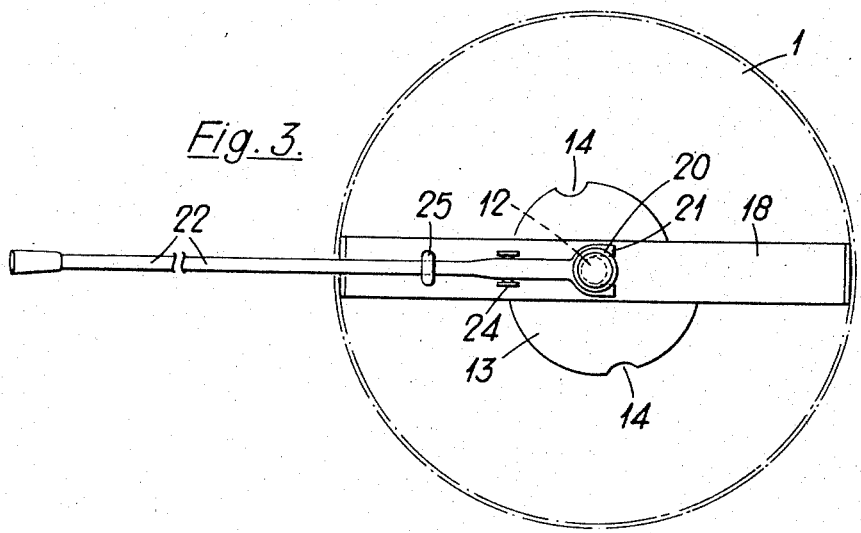

The charge blender of FIG. 4 differs from that illustrated in FIGS. 1 to 3 in the form of the flight 13a of the modified Archimedean screw 11. In this case, the flight is inclined with respect to the axis of the shaft 12 in the sense that the intersection of the flight with any plane containing the axis of the screw, for instance the flight section plane shown in FIG. 4, has a trace that slopes downwardly outwards from the axis of the shaft 12 (when the latter is in its operative vertical attitude), instead of being at rightangles to the shaft axis as is the case in the screw 11 of the charge blender illustrated in FIGS. 1 to 3. This inclination of the screw flight with respect to its axis is indicated by the angle 26 in FIG. 4.

Because of this inclination of the screw flight with respect to the screw axis, the screw is a relatively inefficient auger and when rotated within a mass of charge material in the sense to cause lifting of the latter, will only lift a small proportion of the charge material from the lowest level in the hopper 1 to the highest level thereof, considerable quantities of charge material being spilled and propelled outwardly by reaction upon the inclined flight surface, whereby any given portion of the charge will tend rapidly to be distributed throughout the bulk of the latter.

In use of a broadcasting device equipped with a charge blender in accordance with the invention, for instance as illustrated in the drawings, the container or hopper 1 of the device is first charged with the individual ingredients of a fertilizer composition to be broadcast by the device, the gate 4 for the outlet of the container being closed at this time. If the charge blender is of the disengagable drive form such as that illustrated and as is preferred, its drive is engaged, preferably before the hopper is charged, e.g. by releasing the lever 22 from the hook 25. The distributor of the broadcasting device is then operated: in the case of the illustrated device, this is effected by the power take-off from the tractor which is fitted with the device, whereas in the case of a device with a wheel-driven distributor the device would be trailed for this purpose. Typically, operation of the distributor for 40 to 60 seconds will be sufficient to accomplish complete blending of the charge material whereafter the gate of the container outlet may be opened and the device operated in the conventional manner to accomplish broadcasting of the blended charge. In the case of a charge blender having disengagable drive, it is preferred to have this drive disengaged during broadcasting since whilst continued rotation of the screw of the blender during the broadcasting operation will not ordinarily interfere with the latter, it has been found that certain fertilizer ingredients, particularly potash, tend to be ground to a powder by continual operation of the charge blender and, as a result, fail properly to be broadcast and produce a dust nuisance if broadcasting is effected in windy conditions. Moreover, wear of the charge blender, and in particular of the bearing at the upper end of the screw thereof, is minimized by having the blender out of operation during the broadcasting. In the event that the blender is not equipped for disengagement lift its drive whilst in place within the container of the broadcasting device, it will be understood that the complete blender may be removed after having performed the blending operation.

Whilst a broadcasting device equipped with a charge blender in accordance with the invention is ideally suited for blending charge ingredients separately introduced into the container of the device in selected proportions to make up a fertilizer composition of chosen analysis, such a device could also be utilised to accomplish reblending of bulk-blended fertilizer compositions that, immediately following blending, have been bagged in amounts corresponding to a charge for such a broadcasting device. The usual objection to bulk blending, namely the segregation of ingredients that occurs during transport and storage, and caking, would not apply in this case since the mixture comprising a charge and having, overall, the required analysis would be reblended and made free-flowing by the operation of the charge blender in the device immediately prior to broadcasting.

I claim:

1. For a broadcasting device having a charge container, a movable distributor for broadcasting charge material in said container and shut-off means closable to isolate said distributor from charge material in said container, a charge blender comprising
   a. a modified Archimedean screw adapted to be arranged with its axis vertical within said charge container;
   b. disengageable drive means for coupling said screw to said distributor for rotation in response to the motion of the distributor while said shut-off means is closed;
   c. said screw having a flight adapted when so rotated to function as an auger to lift and laterally displace charge material in its vicinity, thereby to blend the charge material constituents.

2. For a broadcasting device having a conical hopper with a gated central axial outlet to a rotary distributor for broadcasting charge material in said hopper, a charge blender comprising
   a. a modified Archimedean screw with a single flight of progressively increasing radial extent adapted to be arranged coaxially within said hopper;
   b. disengageable drive means for coupling said screw to said distributor for rotation therewith while said gated outlet is closed;
   c. said screw flight being adapted when so rotated to lift and laterally displace charge material in its vicinity in the hopper, thereby to blend the charge material constituents.

3. A broadcasting device comprising
   a. a charge container;
   b. a movable distributor for broadcasting charge material in said container;
   c. shut-off means closable to isolate said distributor from said container;
   d. a charge blender including
      i. a modified Archimedean screw arranged with its axis vertical in said container;
      ii. disengageable drive means coupling said screw to said distributor for rotation in response to the motion thereof while said shut-off means is closed;
      iii. said screw having a flight functioning, when the screw is rotated, as an auger to ligt and laterally displace charge material in its vicinity in said container, thereby to blend the charge material constituents.

4. The broadcasting device of claim 3, in which said charge container is an upright conical hopper having a central axial outlet to said distributor, said shut-off means comprises a closable gate for said outlet, said screw is arranged coaxially within said hopper, and said screw flight is of progressively increasing radial extent.

5. The broadcasting device of claim 4, in which said screw flight has a periphery defining a notional conical surface of cone angle not greater than one-half the cone angle of said hopper.

6. The broadcasting device of claim 5, in which said screw flight is formed progressively to spill charge material lifted by it.

7. The broadcasting device of claim 6, in which said screw flight is inclined with respect of the screw axis so that the intersection of the flight with any plane containing the axis of the screw has a trace that slopes downwardly outwards.

8. The broadcasting device of claim 6, in which said screw flight has window areas through which charge material may fall to become associated with underlying portions during lifting by rotation of the screw.

9. The broadcasting device of claim 8 in which the upper end of said screw is supported in a bearing in a transverse bearer spanning the upper end of said hopper.

10. The broadcasting device of claim 9, in which said drive means comprise a transverse drive pin adapted for driving engagement in a slot in a drive shaft for said distributor.

11. A broadcasting device comprising a. an upright conical hopper constituting a charge container;
b. a movable distributor for broadcasting charge material in said container;
c. a central axial outlet from said charge container to said distributor;
d. a gate for said outlet, closable to isolate said distributor from said container;
e. a modified Archimedean screw arranged coaxially within said hopper;
f. said screw having a flight of progressively increasing radial extent;
g. said flight being inclined with respect to the screw axis so that the intersection of the flight with any plane containing the axis of the screw has a trace that slopes downwardly outwards, whereby when the screw is rotated it lifts, laterally displaces and blends charge material constituents in said hopper;
h. disengageable drive means for coupling said screw to said distributor for rotation in response to the motion thereof while said gate is closed.

12. A broadcasting device comprising
a. an upright conical hopper constituting a charge container;
b. a movable distributor for broadcasting charge material in said container;
c. a central axial outlet from said charge container to said distributor;
d. a gate for said outlet, closable to isolate said distributor from said container;
e. a modified Archimedean screw arranged coaxially within said hopper;
f. said screw having a flight of progressively increasing radial extent;
g. said flight being formed progressively to spill charge material lifted by rotation of the screw;
h. a transverse bearer spanning the upper end of said hopper;
i. a bearing on said bearer supporting the upper end of said screw;
j. a drive shaft for said distributor;
k. a transverse drive pin at the lower end of said screw adapted for driving engagement with a slot in said drive shaft.

13. The broadcasting device of claim 12, including a pivoted lever supported by said bearer, a forked end of said lever engaging a collar on the screw, said lever being rockable to lower and raise the screw with respect to the bearer for engaging and disengaging said drive pin in said slot.

* * * * *